United States Patent
Gupta et al.

(10) Patent No.: US 11,432,132 B2
(45) Date of Patent: Aug. 30, 2022

(54) DROPPING EXTRANEOUS DISCOVERY MESSAGES

(71) Applicant: Motorola Mobility LLC, Chicago, IL (US)

(72) Inventors: Ranjeet Gupta, Bengaluru (IN); Mary Khun Hor-Lao, Chicago, IL (US); Binesh Balasingh, Naperville, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/276,293

(22) Filed: Feb. 14, 2019

(65) Prior Publication Data
US 2020/0267527 A1 Aug. 20, 2020

(51) Int. Cl.
*H04W 8/00* (2009.01)
*H04L 67/1061* (2022.01)
(Continued)

(52) U.S. Cl.
CPC .......... *H04W 8/005* (2013.01); *H04L 12/185* (2013.01); *H04L 12/189* (2013.01); *H04L 41/0869* (2013.01); *H04L 61/2069* (2013.01); *H04L 67/1061* (2013.01); *H04L 67/16* (2013.01); *H04W 4/06* (2013.01); *H04W 28/0221* (2013.01); *H04W 28/0273* (2013.01); *H04W 28/0289* (2013.01); *H04W 4/80* (2018.02)

(58) Field of Classification Search
CPC ......... H04W 8/005; H04W 4/06; H04W 4/80; H04W 28/0221; H04W 28/0273; H04W 28/0289; H04L 12/185; H04L 12/189; H04L 41/0869; H04L 61/2069; H04L 67/1061; H04L 67/16
See application file for complete search history.

(56) References Cited

U.S. PATENT DOCUMENTS 6,215,792 B1   4/2001   Abi-Nassif et al.
7,177,295 B1*  2/2007   Sholander ............ H04W 40/26
                                                    370/338
(Continued)

OTHER PUBLICATIONS

"Shapeheart Armband | Heart rate tracking & easy phone access", Retrieved at: https://www.kickstarter.com/projects/2052448589/shapeheart-armband-heart-rate-tracking-and-easy-ph—on Oct. 24, 2018, 22 pages.

(Continued)

*Primary Examiner* — Blake J Rubin
(74) *Attorney, Agent, or Firm* — Fig. 1 Patents

(57) ABSTRACT

In aspects of dropping extraneous discovery messages, a device application can initiate a discovery message in a device, such as a multicast message initiated for network discovery or discovery of network services. The device implements a status module that can interpose the routing of the discovery message in the device, and determine whether a response to a previous discovery message was received. The status module can also determine a device state of the device, where the device state can indicate whether a discovery message response is necessary. The status module is implemented to drop the discovery message if the response to the previous discovery message was not received and based on the device state indicating that a discovery message response is extraneous.

20 Claims, 6 Drawing Sheets

(51) Int. Cl.
*H04L 67/51* (2022.01)
*H04L 41/0869* (2022.01)
*H04L 12/18* (2006.01)
*H04W 4/06* (2009.01)
*H04W 28/02* (2009.01)
*H04L 61/5069* (2022.01)
*H04W 4/80* (2018.01)

(56) References Cited

U.S. PATENT DOCUMENTS

| | | | | |
|---|---|---|---|---|
| 8,560,609 | B2* | 10/2013 | Nathanson | H04L 63/08 709/224 |
| 8,626,912 | B1* | 1/2014 | Rothstein | H04L 43/04 709/224 |
| 9,135,612 | B1* | 9/2015 | Proctor, Jr. | G06Q 20/3278 |
| 9,414,300 | B2* | 8/2016 | Wurm | H04W 48/16 |
| 10,959,155 | B2* | 3/2021 | Poitau | H04W 40/246 |
| 2005/0005013 | A1* | 1/2005 | Saint-Hilaire | H04L 41/0809 709/227 |
| 2005/0044217 | A1* | 2/2005 | Moreau | H04L 61/15 709/224 |
| 2005/0108331 | A1* | 5/2005 | Osterman | H04L 29/06 709/204 |
| 2008/0279161 | A1* | 11/2008 | Stirbu | H04L 67/16 370/338 |
| 2009/0219832 | A1* | 9/2009 | Velev | H04W 40/36 370/254 |
| 2011/0026435 | A1* | 2/2011 | Weniger | H04W 8/065 370/254 |
| 2011/0153818 | A1* | 6/2011 | Vandwalle | H04L 69/28 709/224 |
| 2013/0282860 | A1* | 10/2013 | Zhang | H04L 67/16 709/217 |
| 2013/0318570 | A1* | 11/2013 | L. | H04L 63/00 726/4 |
| 2014/0169372 | A1* | 6/2014 | Kardashov | H04L 43/026 370/392 |
| 2014/0215580 | A1* | 7/2014 | Behringer | H04L 63/20 726/5 |
| 2014/0309806 | A1* | 10/2014 | Ricci | G06F 21/32 701/1 |
| 2015/0055509 | A1* | 2/2015 | De Bus | H04L 65/403 370/254 |
| 2015/0156630 | A1* | 6/2015 | Ankaiah | H04L 63/101 726/4 |
| 2015/0296028 | A1* | 10/2015 | Scott | H04L 45/02 709/217 |
| 2015/0327157 | A1* | 11/2015 | Al-Shalash | H04W 4/70 370/328 |
| 2016/0007289 | A1* | 1/2016 | Weizman | H04W 52/0229 370/311 |
| 2016/0072678 | A1* | 3/2016 | Dong | H04L 67/16 370/254 |
| 2016/0127197 | A1* | 5/2016 | Yethadka | H04L 41/0853 709/224 |
| 2016/0142897 | A1* | 5/2016 | Sorrentino | H04W 76/14 370/329 |
| 2016/0155327 | A1* | 6/2016 | Schlienz | H04W 8/005 340/907 |
| 2016/0286471 | A1* | 9/2016 | Zisimopoulos | H04W 48/16 |
| 2016/0309472 | A1 | 10/2016 | Yong et al. | |
| 2017/0006117 | A1* | 1/2017 | Kafle | H04W 72/085 |
| 2017/0041868 | A1* | 2/2017 | Palin | H04L 5/0048 |
| 2017/0078408 | A1* | 3/2017 | Lepp | H04L 67/42 |
| 2017/0093855 | A1* | 3/2017 | Perez | H04L 61/6004 |
| 2017/0164264 | A1* | 6/2017 | Kato | H04L 45/122 |
| 2017/0188330 | A1* | 6/2017 | Bischinger | H04W 52/283 |
| 2017/0257758 | A1 | 9/2017 | Aldana et al. | |
| 2018/0027398 | A1* | 1/2018 | Jung | H04W 8/005 455/434 |
| 2018/0034923 | A1* | 2/2018 | Mendonca | H04L 41/12 |
| 2018/0091949 | A1 | 3/2018 | Steiner et al. | |
| 2018/0124074 | A1* | 5/2018 | Natarajan | H04L 63/1416 |
| 2018/0139794 | A1* | 5/2018 | Chae | H04W 40/12 |
| 2018/0234908 | A1* | 8/2018 | Di Girolamo | H04L 41/5058 |
| 2018/0255422 | A1* | 9/2018 | Montemurro | H04W 88/10 |
| 2019/0007888 | A1* | 1/2019 | Li | H04L 45/26 |
| 2019/0045346 | A1* | 2/2019 | Macieira | H04W 72/02 |
| 2019/0208270 | A1* | 7/2019 | Bates | H04N 21/41407 |
| 2019/0253869 | A1* | 8/2019 | Xu | H04W 8/005 |
| 2019/0253955 | A1* | 8/2019 | Abedini | H04B 7/088 |
| 2019/0387458 | A1* | 12/2019 | Li | H04W 4/50 |
| 2020/0029213 | A1* | 1/2020 | Nolscher | H04L 9/3226 |
| 2020/0059767 | A1* | 2/2020 | Woo | H04W 4/02 |
| 2020/0068520 | A1 | 2/2020 | Marri Sridhar et al. | |
| 2020/0127751 | A1 | 4/2020 | Itagaki et al. | |
| 2020/0154511 | A1* | 5/2020 | Pan | H04W 76/40 |
| 2020/0186998 | A1* | 6/2020 | Smith | H04W 12/75 |
| 2020/0228948 | A1* | 7/2020 | Watfa | H04L 67/16 |
| 2020/0252857 | A1* | 8/2020 | Gupta | H04W 8/005 |
| 2020/0273326 | A1* | 8/2020 | Shotton | H04W 4/80 |
| 2020/0336547 | A1* | 10/2020 | Sabharwal | H04L 45/48 |
| 2020/0382466 | A1* | 12/2020 | Ly | H04L 41/12 |
| 2021/0051561 | A1 | 2/2021 | Gupta et al. | |

OTHER PUBLICATIONS

"Non-Final Office Action", U.S. Appl. No. 16/540,924, dated Jan. 25, 2021, 11 pages.

"Corrected Notice of Allowability", U.S. Appl. No. 16/540,924, dated Jul. 14, 2021, 11 pages.

"Notice of Allowance", U.S. Appl. No. 16/540,924, dated Jun. 25, 2021, 14 pages.

* cited by examiner

DROPPING EXTRANEOUS DISCOVERY MESSAGES

BACKGROUND

Devices such as smart devices, Internet of Things (IoT) devices, wireless access points, devices used in various industries, consumer electronics, and the like are deployed in many different ways to implement various services. These devices are implemented for use in a wide range of industries and may use various networking technologies and protocols to communicate with other devices, servers, and/or cloud systems. Typically, the devices publish services as part of discovery messages (e.g., beacons, probe requests, discovery frames, and peer-to-peer frames) that are unicast, multicast, or broadcast, which initiates a device that receives the discovery messages to respond. If a receiving device is in a low-power or idle state and receives discovery messages that request a response, the receiving device may then need to transition from the idle state to an active state in order to respond to the received discovery messages. However, in many cases, the discovery messages are unneeded or are not required, which results in unnecessary communications that can congest network bandwidth, as well as drain the battery power of a device. Similarly, a device in an idle state has applications that can generate many unneeded network messages that are of little use to the device because the services have not changed, further causing network bandwidth congestion and draining the battery power of the device.

Generally, network discovery is the process by which a computing device and other network devices are able to discover each other for network communication, monitor data traffic on a current network, and construct a comprehensive map of available and accessible network assets. The network discovery capable devices passively observe data traffic on specified network segments, and each device compares specific packet header values and other unique data from network traffic against established definitions to determine the number and types of hosts, including network devices, on a current network, as well as the operating systems, active applications, and open ports on the hosts or devices. For example, network discovery is standard Internet protocol, as derived by the Internet Engineering Task Force (IETF) and traditionally named as the Neighbor Discovery Protocol (NDP), which is implemented for IPv6 and increasingly popular in the IoT space, adding billions of new devices each year and adding to bandwidth congestion problems. The NDP defines the five different ICMP packet types, including a pair of router solicitation and router advertisement messages, a pair of neighbor solicitation and neighbor advertisement messages, and a redirect message.

Service discovery is a process by which a network device can automatically detect other devices that offer respective services on a device network. Service discovery is standard Internet network protocol, as derived by the Internet Engineering Task Force (IETF) and traditionally named as the Simple Service Discovery Protocol (SSDP), which is implemented for advertising and discovery of network services and presence information. The SSDP is implemented on top of the service discovery protocol for Universal Plug and Play (UPnP) and is part of UPnP protocol stack. When a device is implemented for network communication, the device multicasts a number of discovery messages advertising itself, its embedded device, and its services. The device also listens to receive other device services and respond to requests for capability. Notably, these discovery messages are used extensively in smart home devices and IoT environments, where various devices are continuously (and periodically) looking for the new services and updating their capabilities.

The increasing use and popularity of service discovery (SSDP) and network discovery (NDP), as well as the flood of UPnP and multicast Domain Name System (MDNS) discovery messages, causes network congestion which can lead to a poor user experience due to low LAN throughput, frequent disconnections, LAN Denial of Service, and power dissipation on a device. These are universal problems for most mobile and/or network devices. Moreover the problem escalates when a Bluetooth™ personal area network (PAN), which provides IP connectivity for point-to-point or point-to-multipoint applications over Bluetooth™, is bridged to a fixed Ethernet network or Wireless LAN (WLAN) in a digital home architecture, where the periodic message from UPnP and NDP protocols drain battery power of the devices. Notably, these discovery messages are generally communicated out based on a fixed period of time, with no intelligent oversight as to the periodicity of the discovery messages being communicated.

BRIEF DESCRIPTION OF THE DRAWINGS

Implementations of dropping extraneous discovery messages are described with reference to the following Figures. The same numbers may be used throughout to reference like features and components shown in the Figures.

DETAILED DESCRIPTION

Figure 1:
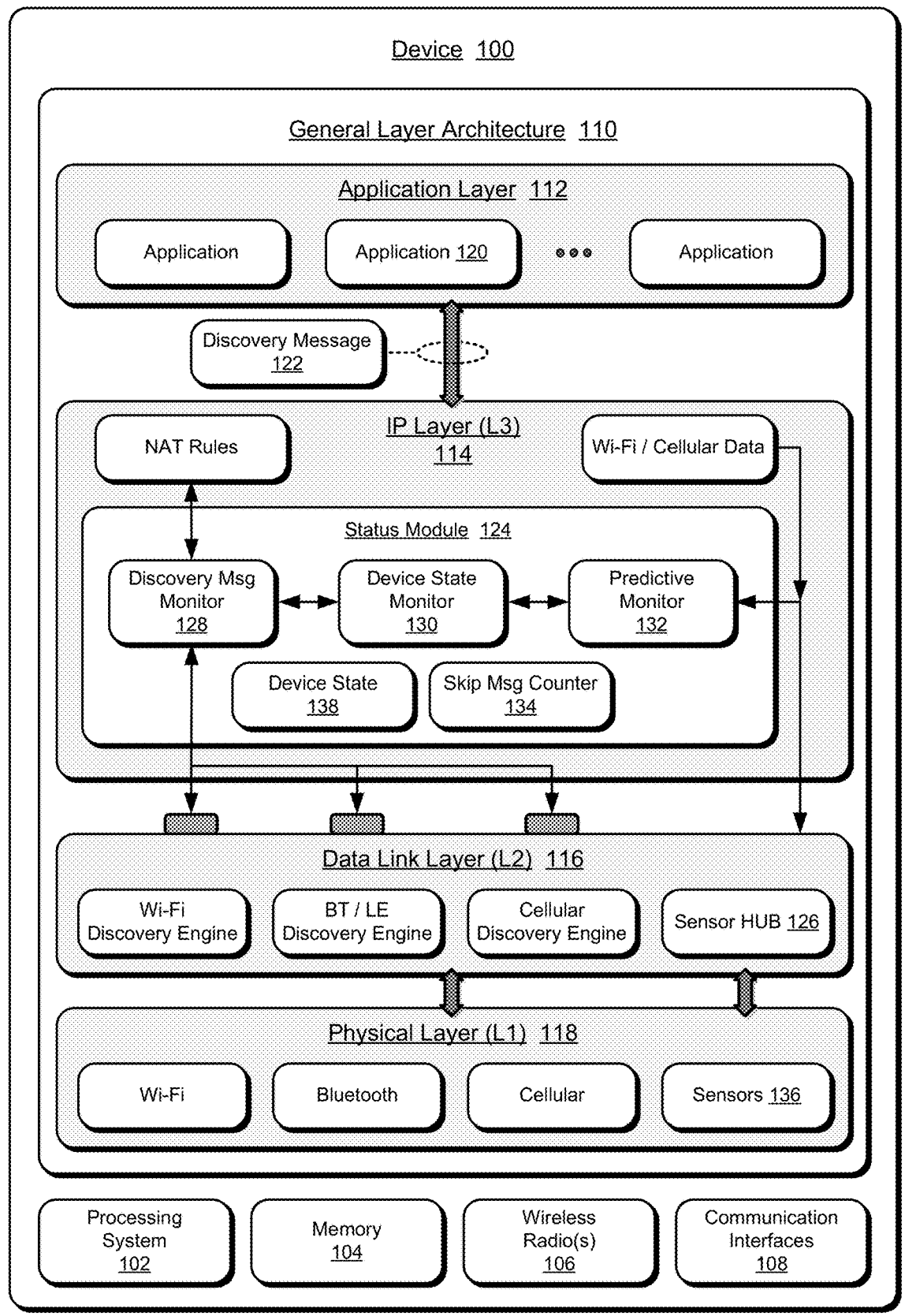
FIG. 1 illustrates an example device that can be used to implement techniques of dropping extraneous discovery messages as described herein.

Implementations of dropping extraneous discovery messages are described, and provide techniques to determine whether discovery messages initiated by device applications in a device can be dropped before being communicated or transmitted from the device. Notably, dropping extraneous discovery messages can maintain a device operating in a low-power state and conserves battery power, as well as avoids contributing to communication bandwidth congestion. The features and aspects of dropping extraneous discovery messages can be implemented by any device, access point, node device, or other computing device that is implemented for wired and/or wireless network communication or service.

Generally, a network of devices can include multiple devices or systems, such as Internet of Things (IoT) devices, smart devices, access points, node devices, consumer electronics, and any other type of devices that generate and/or communicate or otherwise transmit discovery messages for network discovery or discovery of network services. For example, there are many multicast protocols, particularly in the context of smart home devices that are stationary, yet are implemented to periodically search for proximate devices, even if they are not moving, such as a television device that multicasts discovery messages to discover new devices and services. However, this can lead to unnecessary battery drain of a device by not only communicating or transmitting the discovery messages, but also responding to all of the discovery messages received from the various devices or systems. Additionally, a device communicating and/or responding to all of the discovery messages congests network bandwidth and adds unnecessary noise on the communication medium.

In aspects of dropping extraneous discovery messages, a device can be implemented to determine whether discovery messages initiated by device applications can be dropped before being communicated or transmitted from the device. Generally, as a type of computing device, the device implements a status module that can interpose a routing of a discovery message, which generally refers to the functions or operations performed to detect and identify the discovery message, and subsequently determine whether the discovery message can be dropped prior to communication or transmission from the device. As noted above, the device applications in the device that can generate many unneeded discovery messages that are of little use to the device because the services have not changed, causing network bandwidth congestion and draining the battery power of the device.

In implementations, the status module can receive sensor data from device sensors to determine a device state of the device, which may indicate that the device is in a stationary mode or in a vehicle mode. Notably, a response to a discovery message may be extraneous (e.g., unneeded, irrelevant) if the device state of the device is in either the stationary mode or in the vehicle mode, due to the device generally not moving, or moving too fast to meaningfully connect for service. Additionally, a determination of the device state may also include a check of whether the device is operating in a lower-power or idle state.

Alternatively or in addition to a determination of the device state of a device based on sensor data, the status module can determine the device state based on cellular data and/or Wi-Fi data. The status module can determine the device state based on a cellular data threshold change and/or based on a Wi-Fi data threshold change that indicates the device is stationary or rapidly moving, such as in a vehicle. Notably, a determination of the device state based on cellular data and/or Wi-Fi data can still be performed if a device does not include device sensors. Any one or combination of data obtained from device sensors, from cellular data, or from Wi-Fi data can be used to implement the periodicity of discovery messages being communicated or transmitted from a device. The data obtained from device sensors, from cellular data, and/or from Wi-Fi data can be used by the status module to intelligently identify when to communicate or transmit discovery messages in compliance with current protocols, while maintaining a lower-power profile, and avoiding adding to network bandwidth congestion.

While features and concepts of dropping extraneous discovery messages can be implemented in any number of different devices, systems, networks, environments, and/or configurations, implementations of dropping extraneous discovery messages are described in the context of the following example devices, systems, and methods.

FIG. 1 illustrates an example of a device 100 in which techniques of dropping extraneous discovery messages can be implemented, as described herein. In this example, the device 100 is representative of any type of a computing device, mobile device (e.g., mobile phone or tablet), Internet of Things (IoT) device, wireless device, access point, node device, and/or electronic device implemented for network and/or wireless communication. The device 100 may also be configured as a wearable device that is designed to be worn by, attached to, carried by, or otherwise transported by a user, such as any type of glasses, a smart band or watch, media playback device, and fitness device. Other examples of wearable devices include, but are not limited to, badges, a key fob, an access card, and a ring, an article of clothing, a glove, or a bracelet, to name a few examples. Generally, the device 100 can be implemented with various components, such as a processing system 102 and memory 104, as well as any number and combination of different components as further described with reference to the example device shown in FIG. 6.

Various devices can communicate with each other via a network (e.g., WLAN) or via a direct peer-to-peer connection (e.g., Wi-Fi Direct, Bluetooth™, Bluetooth LE (BLE), RFID, etc.). The device 100 can include wireless radios 106 that facilitate wireless communications, as well as communication interfaces 108 that facilitate network communications. The device 100 can be implemented for data communication between devices and network systems, which may include wired and/or wireless networks implemented using any type of network topology and/or communication protocol, to include IP based networks, and/or the Internet, as well as networks that are managed by mobile network operators, such as a communication service providers, mobile phone providers, and/or Internet service providers.

In this example, operational aspects of the device 100 are represented with a general layer architecture 110, which is generally representative of an Internet Protocol Suite (TCP/IP four-layer model), or an Open System Interconnection Model (OSI seven-layer model), that characterizes the communication and networking functions in the device. This general layer architecture 110 is shown to have an application layer 112, an Internet protocol (IP) layer 114, a data link layer 116, and a physical layer 118. The application layer 112 includes device applications 120 that generate and initiate to communicate data (as discovery messages), and the application layer 112 includes the protocols used by the device applications 120 to provide user services and exchange of application data over the network connections established by the lower level protocols.

A device application 120 can initiate a discovery message 122, generally as a unicast, multicast, or broadcast message initiated for network discovery or discovery of network services. In implementations, the discovery message 122 may be a Simple Service Discovery Protocol (SSDP) message initiated by the device application 120 for discovery of network services; a Neighbor Discovery Protocol (NDP) message initiated by the device application 120 for network discovery; or a multicast Domain Name System (MDNS) message initiated by the device application 120 for IP address identification. Additionally, a discovery message 122 can be IP-based, or non-IP (MAC) based, such as for Wi-Fi SD or BLE advertisement. As noted above, network discovery is the process by which a computing device and other network devices (e.g., the device 100) are able to discover each other for network communication, monitor data traffic on a current network, and construct a comprehensive map of available and accessible network assets.

Network discovery is standard Internet protocol, as derived by the Internet Engineering Task Force (IETF) and traditionally named as the Neighbor Discovery Protocol (NDP), which is implemented for IPv6 and increasingly popular in the IoT space, adding billions of new devices each year and adding to bandwidth congestion problems. The NDP defines the five different ICMP packet types, including a pair of router solicitation and router advertisement messages, a pair of neighbor solicitation and neighbor advertisement messages, and a redirect message.

Service discovery is a process by which a device can automatically detect other devices that offer respective services on a device network. Service discovery is standard Internet network protocol, as derived by the Internet Engineering Task Force (IETF) and traditionally named as the Simple Service Discovery Protocol (SSDP), which is implemented for advertising and discovery of network services and presence information. When the device 100 is communicatively connected (wired and/or wirelessly) or even not currently network connected, the device applications 120 can initiate to broadcast or multicast a number of discovery messages advertising itself, its embedded device, and its services. Notably, these discovery messages are used extensively in smart home devices and IoT environments, where various devices are continuously (and periodically) looking for the new services and updating their capabilities.

The IP layer 114 (also commonly referred to as "L3") of the general layer architecture 110 is representative of the data communication channels for the data messages to and from the device applications 120 in the application layer 112, and generally provides for address and routing of network connections, host addressing and identification, and packet routing. Generally, aspects of the IP layer 114 implement message transfer services, and protocols in this layer provide error control, segmentation, flow control, and bandwidth congestion control. In this example, the IP layer 114 includes a status module 124 that implements aspects of dropping extraneous discovery messages, as described herein and in more detail below.

The data link layer 116 (also commonly referred to as "L2") of the general layer architecture 110 generally provides for data transfer between network entity components, the transmission of internet layer data, protocols used to describe the local network topology, and the interfaces needed to effect transmission of Internet layer datagrams. In this example, the data link layer 116 includes various discovery engines, such as for Wi-Fi, Bluetooth™ and LE, cellular (wireless), as well as a sensor HUB 126. The physical layer 118 (also commonly referred to as "L1") of the general layer architecture 110 includes the wireless radios 106 and the communication interfaces 108, as well as any other hardware electronic circuits of network communication technologies.

In aspects of dropping extraneous discovery messages, the status module 124 includes monitor components, such as a discovery message monitor 128, a device state monitor 130, and a predictive monitor 132. The status module 124 may be implemented to include independent processing, memory, and logic components as a computing and/or electronic device integrated with the device 100. Alternatively or in addition, the status module 124 can be implemented as a software application or software module, such as computer-executable software instructions that are executable with a processor (e.g., with the processing system 102) of the device 100. As a software application, the status module 124 can be stored on computer-readable storage memory (e.g., the device memory 104), such as any suitable memory device or electronic data storage implemented with the device.

The discovery message monitor 128 of the status module 124 is implemented to interpose a routing of the discovery message 122 that has been initiated by a device application 120. As noted above, the discovery message 122 can be any type of unicast, multicast, or broadcast message intended for communication and/or transmission from the respective wireless radios 106 and communication interfaces 108 of the device 100. The discovery message monitor 128 interposes the discovery message 122, which generally refers to the functions or operations performed to detect and identify the discovery message 122, and subsequently determine whether the discovery message can be dropped prior to communication or transmission from the device. Notably, dropping the discovery message 122 can maintain the device 100 operating in a low-power or idle state and conserves battery power, as well as avoids contributing to communication bandwidth congestion. Various implementations of determining whether the discovery message 122 can be dropped in the device 100 are further described with reference to the features shown in FIGS. 2-5.

The status module 124 includes a skip message counter 134 that can be incremented each time a discovery message 122 is dropped, rather than the discovery message being communicated or transmitted from the device 100. When a threshold x-number of discovery messages have previously been dropped, the status module 124 can override the current discovery message from being dropped, and continue the routing of the discovery message 122 in the device.

The device state monitor 130 of the status module 124 can be registered with the Sensor HUB 126 in the data link layer 116, via which the device state monitor 130 can receive sensor data from device sensors 136 to determine a device state 138 of the device 100. The device sensors 136 can include a camera, RF-based sensors, and/or motion sensors, such as may be implemented as components of an inertial measurement unit (IMU). The motion sensors can be implemented with various sensors, such as a gyroscope, an accelerometer, and/or other types of motion sensors to sense motion of the device. The device state monitor 130 can determine the device state 138 of the device 100 based on input from one or more of the device sensors 136, which indicate that the device is in a stationary mode or in a vehicle mode. Notably, a response to the discovery message 122 may be extraneous (e.g., unneeded, irrelevant) if the device state 138 of the device 100 is in either the stationary mode or in the vehicle mode, due to the device generally not moving, or moving too fast to meaningfully connect for service or logically be interested in discovery changes. Additionally, a determination of the device state 138 by the device state monitor 130 may also include checking whether the device 100 is operating in a lower-power or idle state, such as operating on the low-power IC.

Alternatively or in addition to a determination of the device state 138 of the device 100 based on sensor data, the device state monitor 130 can determine the device state 138 based on cellular data and/or Wi-Fi data, which is generally available at the lower layer from any one of the connectivity transport modules, such as from a Bluetooth™ driver and/or firmware; from a WLAN driver and/or firmware; from a WAN driver and/or firmware; and the like. The device state monitor 130 of the status module 124 can be implemented to access the cellular and/or Wi-Fi data via these various transport modules through the sensor HUB 126, or by a direct data call to the various transport modules. In implementations, the a device state monitor 130 of the status module 124 can determine the device state 138 based on a cellular data threshold change that indicates the device is stationary or rapidly moving, and/or based on a Wi-Fi data threshold change that indicates the device is stationary or rapidly moving, such as in a vehicle.

Notably, a determination of the device state 138 based on cellular data and/or Wi-Fi data can still be performed if an implementation version of the device 100 does not include the device sensors 136. Any one or combination of data obtained from the device sensors 136, from cellular data, or from Wi-Fi data can be used by the device state monitor 130 to implement the periodicity of discovery messages being routed in the IP layer 114 of the general layer architecture 110 in the device 100. As an extension of the aspects of dropping extraneous discovery messages, if the device state monitor 130 determines the device state 138 as the device 100 being in a vehicle mode (e.g., in a train, in a car, or on an airplane), then subsequent discovery messages can also be dropped if responses from the first message types are not received. As trains are detected to be often halting and then resuming, the discovery process can be restarted to determine new devices and/or services that are available at a current location of the device 100.

Similarly, the predictive monitor 132 of the status module 124 can be implemented to determine and track device locations and history, from which a determination to drop a discovery message 122 can be based on the device being in a predictive location where a discovery message response would be extraneous or unnecessary. For example, a particular route of travel or travel in a new area may lead to an increase in discovery messages being initiated by the device applications 120 of the device 100, causing battery power to be consumed more quickly than usual and adding congestion to network bandwidth. In any of the described scenarios, the device state monitor 130 can perform the monitoring operations in the low-power or idle state of the device 100, so as not to impact the output profile of the device operating at the lower-power rate.

The periodic scanning and communication of discovery messages can cause the device 100 to unnecessarily transition to a higher-power rate, determine that a received data packet is not needed, and then drop the data packet. This periodic transition of waking the core processor to process data packets that are determined not to be needed can cause battery power in the device to be consumed more quickly and adds congestion to network bandwidth. The data obtained from the device sensors 136, from the cellular data, and/or from the Wi-Fi data can be used by the device state monitor 130 to intelligently identify when to communicate or transmit discovery messages in compliance with current protocols, while maintaining a lower-power profile, and avoiding adding to network bandwidth congestion.

Example methods 200, 300, 400, and 500 are described with reference to respective FIGS. 2-5 in accordance with implementations of dropping extraneous discovery messages. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
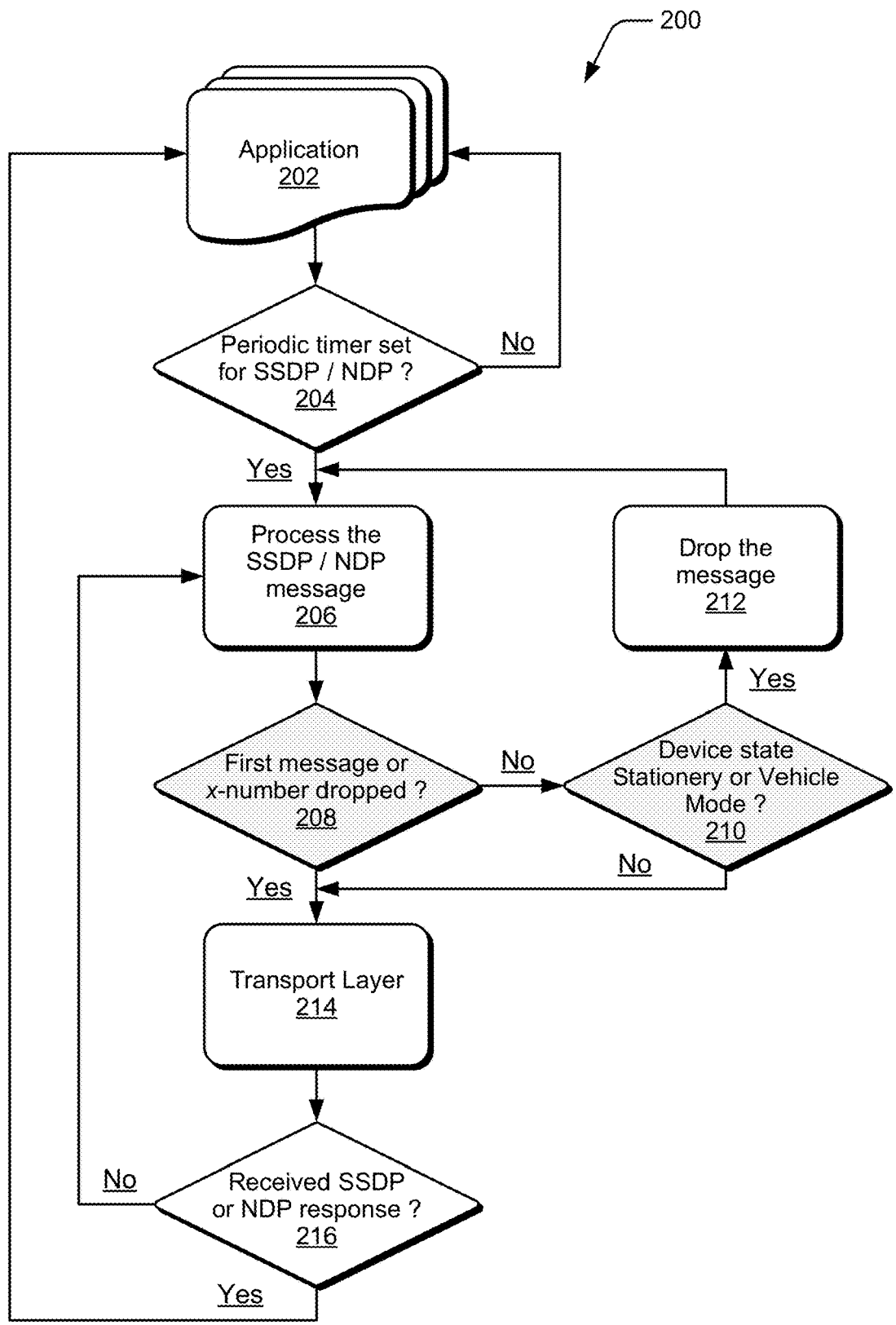
FIG. 2 illustrates an example method of dropping extraneous discovery messages in a device and based on device sensors in accordance with one or more implementations of the techniques described herein.

FIG. 2 illustrates example method(s) 200 of dropping extraneous discovery messages, and is generally described with reference to the status module implemented in a device and based on device sensors. The order in which the method is described is not intended to be construed as a limitation, and any number or combination of the described method operations can be performed in any order to perform a method, or an alternate method.

At 202, a device application initiates a discovery message in a device. For example, an application 120 in the device 100 initiates a discovery message 122, generally as a multicast message initiated by the device application for network discovery or discovery of network services. The discovery message 122 may be a Simple Service Discovery Protocol (SSDP) message initiated by the device application 120 for discovery of network services; a Neighbor Discovery Protocol (NDP) message initiated by the device application 120 for network discovery; or a multicast Domain Name System (MDNS) message initiated by the device application 120 for IP address identification. Additionally, a discovery message 122 may be IP-based, or non-IP (MAC) based, such as for Wi-Fi SD or BLE advertisement.

At 204, a determination is made as to whether a periodic timer for discovery messages (e.g., SSDP/NDP) is set in the device. If the periodic timer for discovery messages is not set (i.e., "No" from 204), then the method continues at 202 to monitor for subsequent discovery messages initiated from the device application(s). If the periodic timer for discovery messages is set (i.e., "Yes" from 204), then at 206, the discovery message initiated by the device application at 202 is processed. For example, the device application 120 initiates the discovery message 122 for process and routing in the IP layer 114 of the general layer architecture 110 in the device 100, as shown and described with reference to FIG. 1.

At 208, a determination is made as to whether the discovery message is a first message (e.g., SSDP/NDP type), or whether a threshold x-number of discovery messages have already been dropped. For example, the status module 124 in the device 100 includes the skip message counter 134 that is incremented each time a discovery message is dropped, rather than being communicated from the device. Notably, if the discovery message 122 is not the first attempt at the particular discovery message, and the skip message counter 134 has not yet incremented to the threshold x-number of discovery messages that have already been dropped in the device, then a determination can be made as to whether the current discovery message 122 is extraneous and can be dropped in the device.

If the discovery message is not the first message of the particular type of discovery message, or the skip message counter has not yet incremented to the threshold x-number of dropped messages (i.e., "No" from 208), then at 210, a determination is made as to whether the device state indicates that the device is in either a stationary mode or in a vehicle mode. For example, the device state monitor 130 of the status module 124 determines the device state 138 of the device 100, and in implementations, the device state can be determined from the device sensors 136 that indicate the device is in a stationary mode or in a vehicle mode. Notably, the discovery message response may be extraneous if the device state 138 of the device 100 is in either the stationary mode or in the vehicle mode, due to the device generally not moving, or moving too fast to meaningfully connect for service. Additionally, a determination of the device state 138 by the device state monitor 130 may also include checking whether the device 100 is operating in a lower-power or idle state, such as operating on the low-power IC.

If the device state indicates that the device is either in a stationary mode or in a vehicle mode (i.e., "Yes" from 210), then at 212, the discovery message that was initiated by the device application at 202 is dropped. For example, the status module 124 in the device 100 drops the discovery message 122 if the response to the previous discovery message was not received and based on the device state 138 indicating that the device is either in a stationary mode or in a vehicle mode. Notably, dropping the discovery message 122 can maintain the device operating in a low-power or idle state and conserves battery power, as well as avoids contributing to communication bandwidth congestion by sending out the discovery message. The method can then continue at 206 to process and route the discovery message 122 in the IP layer 114 of the general layer architecture 110 in the device 100.

If the discovery message is the first message of the particular type of discovery message (e.g., SSDP/NDP type), or the skip message counter has reached the threshold x-number of dropped messages (i.e., "Yes" from 208); or if the device state indicates that the device is not in either a stationary mode or a vehicle mode (i.e., "No" from 210); then at 214, the discovery message 122 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

At 216, a determination is made as to whether a response to the discovery message (e.g., SSDP/NDP type) has been received. If the response to the discovery message has not been received (i.e., "No" from 216), then the method continues at 206 to process and route the discovery message 122 in the IP layer 114 of the general layer architecture 110 in the device 100. If the response to the discovery message has been received (i.e., "Yes" from 216), then the method continues at 202 to monitor for subsequent discovery messages initiated from the device application(s).

Figure 3:
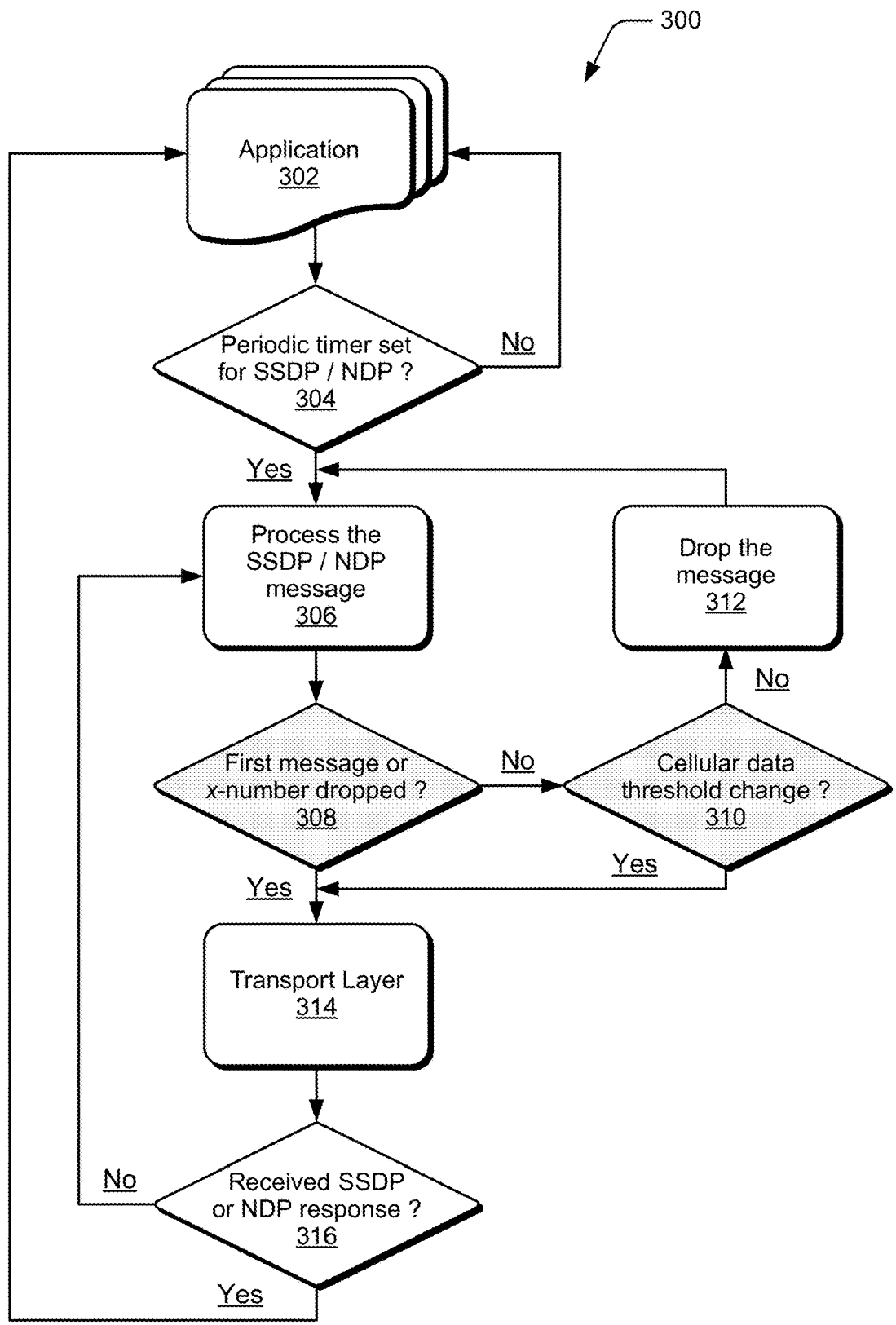
FIG. 3 illustrates an example method of dropping extraneous discovery messages in a device and based on device cellular data in accordance with one or more implementations of the techniques described herein.

FIG. 3 illustrates example method(s) 300 of dropping extraneous discovery messages and is generally described with reference to the status module implemented in a device and based on device cellular data. The order in which the method is described is not intended to be construed as a limitation, and any number or combination of the described method operations can be performed in any order to perform a method, or an alternate method.

At 302, a device application initiates a discovery message in a device. For example, an application 120 in the device 100 initiates a discovery message 122, generally as a multicast message initiated by the device application for network discovery or discovery of network services. The discovery message 122 may be a Simple Service Discovery Protocol (SSDP) message initiated by the device application 120 for discovery of network services; a Neighbor Discovery Protocol (NDP) message initiated by the device application 120 for network discovery; or a multicast Domain Name System (MDNS) message initiated by the device application 120 for IP address identification. Additionally, a discovery message 122 may be IP-based, or non-IP (MAC) based, such as for Wi-Fi SD or BLE advertisement.

At 304, a determination is made as to whether a periodic timer for discovery messages (e.g., SSDP/NDP) is set in the device. If the periodic timer for discovery messages is not set (i.e., "No" from 304), then the method continues at 302 to monitor for subsequent discovery messages initiated from the device application(s). If the periodic timer for discovery messages is set (i.e., "Yes" from 304), then at 306, the discovery message initiated by the device application at 302 is processed. For example, the device application 120 initiates the discovery message 122 for process and routing in the IP layer 114 of the general layer architecture 110 in the device 100, as shown and described with reference to FIG. 1.

At 308, a determination is made as to whether the discovery message is a first message (e.g., SSDP/NDP type), or whether a threshold x-number of discovery messages have already been dropped. For example, the status module 124 in the device 100 includes the skip message counter 134 that is incremented each time a discovery message is dropped, rather than the discovery message being communicated from the device. Notably, if the discovery message 122 is not the first attempt at the particular discovery message, and the skip message counter 134 has not yet incremented to the threshold x-number of discovery messages that have already been dropped in the device, then a determination can be made as to whether the current discovery message 122 is extraneous and can be dropped in the device.

If the discovery message is not the first message of the particular type of discovery message, or the skip message counter has not yet incremented to the threshold x-number of dropped messages (i.e., "No" from 308), then at 310, a determination is made as to whether a threshold change in cellular data at the device indicates that the device does not need to update. For example, the device state monitor 130 of the status module 124 determines that cellular data indicates the device 100 is in a stationary mode, and the discovery message response may be extraneous due to the device generally not moving from an already established service connection. In implementations, the cellular data usable by the status module 124 to determine an update status can include any one or combination of a PCI/CellId (LTE physical cell identity), a delta of the received signal strength indicator (RSSI), the cellular network type, device registration data, a mobile country code (MCC), a mobile network code (MNC), and the like.

If the cellular data indicates no threshold change in the data and generally no need to establish (or re-establish) wireless service (i.e., "No" from 310), then at 312, the discovery message that was initiated by the device application at 302 is dropped. For example, the status module 124 in the device 100 drops the discovery message 122 if the response to the previous discovery message was not received and based on the cellular data indicating that the device is generally stationary with established service. Notably, dropping the discovery message 122 can maintain the device operating in a low-power or idle state and conserves battery power, as well as avoids contributing to communication bandwidth congestion by sending out the discovery message. The method can then continue at 306 to process and route the discovery message 122 in the IP layer 114 of the general layer architecture 110 in the device 100.

If the discovery message is the first message of the particular type of discovery message (e.g., SSDP/NDP type), or the skip message counter has reached the threshold x-number of dropped messages (i.e., "Yes" from 308); or if the cellular data does indicate a threshold change in the data that would necessitate establishing (or re-establishing) wireless service (i.e., "Yes" from 310); then at 314, the discovery message 122 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

At 316, a determination is made as to whether a response to the discovery message (e.g., SSDP/NDP type) has been received. If the response to the discovery message has not been received (i.e., "No" from 316), then the method continues at 306 to process and route the discovery message 122 in the IP layer 114 of the general layer architecture 110 in the device 100. If the response to the discovery message has been received (i.e., "Yes" from 316), then the method continues at 302 to monitor for subsequent discovery messages initiated from the device application(s).

Figure 4:
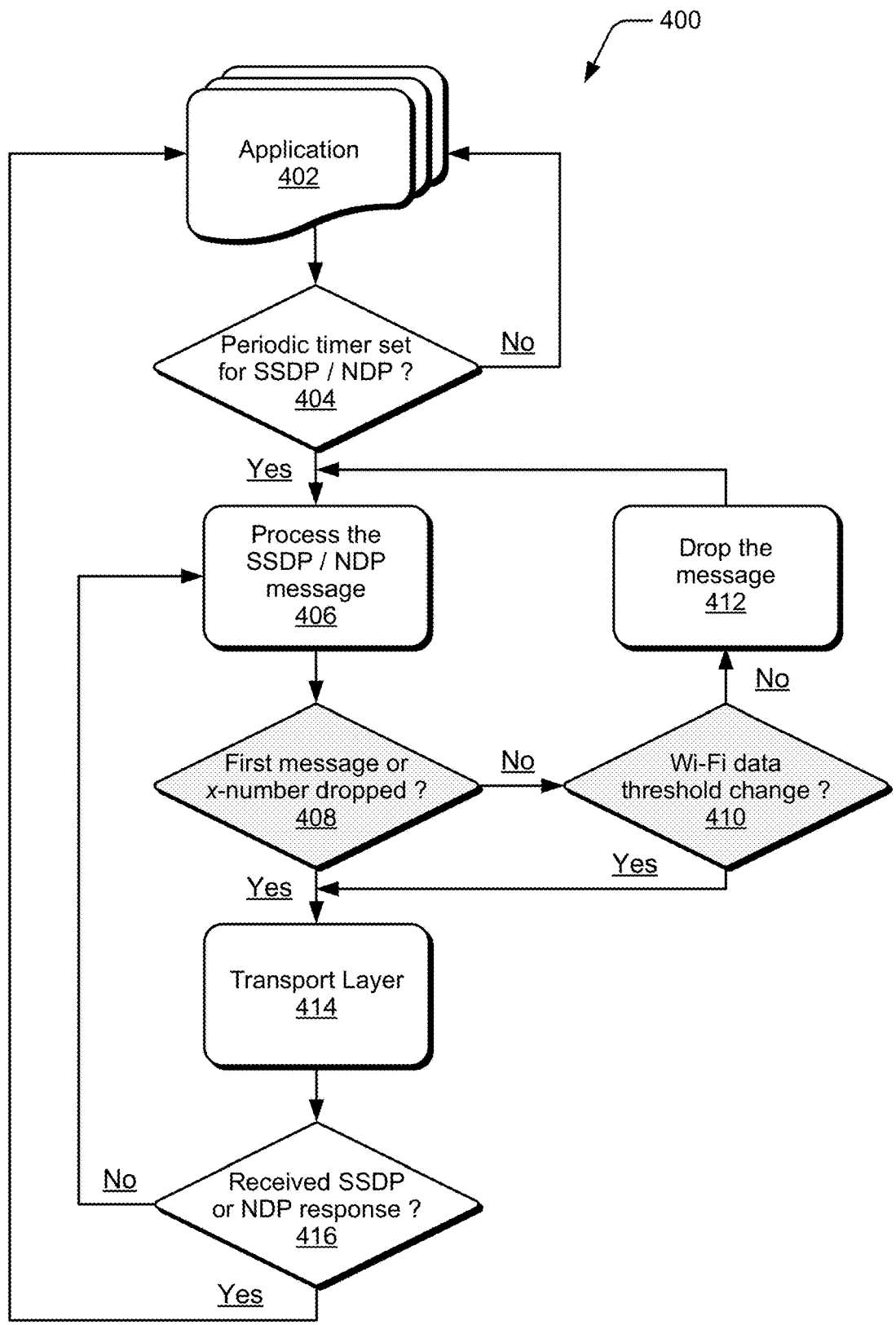
FIG. 4 illustrates an example method of dropping extraneous discovery messages in a device and based on device Wi-Fi data in accordance with one or more implementations of the techniques described herein.

FIG. 4 illustrates example method(s) 400 of dropping extraneous discovery messages and is generally described with reference to the status module implemented in a device and based on device Wi-Fi data. The order in which the method is described is not intended to be construed as a limitation, and any number or combination of the described method operations can be performed in any order to perform a method, or an alternate method.

At 402, a device application initiates a discovery message in a device. For example, an application 120 in the device 100 initiates a discovery message 122, generally as a multicast message initiated by the device application for network discovery or discovery of network services. The discovery message 122 may be a Simple Service Discovery Protocol (SSDP) message initiated by the device application 120 for discovery of network services; a Neighbor Discovery Protocol (NDP) message initiated by the device application 120 for network discovery; or a multicast Domain Name System (MDNS) message initiated by the device application 120 for IP address identification. Additionally, a discovery message 122 may be IP-based, or non-IP (MAC) based, such as for Wi-Fi SD or BLE advertisement.

At 404, a determination is made as to whether a periodic timer for discovery messages (e.g., SSDP/NDP) is set in the device. If the periodic timer for discovery messages is not set (i.e., "No" from 404), then the method continues at 402 to monitor for subsequent discovery messages initiated from the device application(s). If the periodic timer for discovery messages is set (i.e., "Yes" from 404), then at 406, the discovery message initiated by the device application at 402 is processed. For example, the device application 120 initiates the discovery message 122 for process and routing in the IP layer 114 of the general layer architecture 110 in the device 100, as shown and described with reference to FIG. 1.

At 408, a determination is made as to whether the discovery message is a first message (e.g., SSDP/NDP type), or whether a threshold x-number of discovery messages have already been dropped. For example, the status module 124 in the device 100 includes the skip message counter 134 that is incremented each time a discovery message is dropped, rather than the discovery message being communicated from the device. Notably, if the discovery message 122 is not the first attempt at the particular discovery message, and the skip message counter 134 has not yet incremented to the threshold x-number of discovery messages that have already been dropped in the device, then a determination can be made as to whether the current discovery message 122 is extraneous and can be dropped in the device.

If the discovery message is not the first message of the particular type of discovery message, or the skip message counter has not yet incremented to the threshold x-number of dropped messages (i.e., "No" from 408), then at 410, a determination is made as to whether a threshold change in Wi-Fi data at the device indicates that the device does not need to update. For example, the device state monitor 130 of the status module 124 determines that Wi-Fi data indicates the device 100 is in a stationary mode, and the discovery message response may be extraneous due to the device generally not moving from an already established service connection. In implementations, the Wi-Fi data usable by the status module 124 to determine an update status can include any one or combination of a BSSID list of the MAC addresses of wireless access points from a previous scan, the received signal strength indicator (RSSI), Wi-Fi absolute location pillars, and the like.

If the Wi-Fi data indicates no threshold change in the data and generally no need to establish (or re-establish) wireless service (i.e., "No" from 410), then at 412, the discovery message that was initiated by the device application at 402 is dropped. For example, the status module 124 in the device 100 drops the discovery message 122 if the response to the previous discovery message was not received and based on the Wi-Fi data indicating that the device is generally stationary with established service. Notably, dropping the discovery message 122 can maintain the device operating in a low-power or idle state and conserves battery power, as well as avoids contributing to communication bandwidth congestion by sending out the discovery message. The method can then continue at 406 to process and route the discovery message 122 in the IP layer 114 of the general layer architecture 110 in the device 100.

If the discovery message is the first message of the particular type of discovery message (e.g., SSDP/NDP type), or the skip message counter has reached the threshold x-number of dropped messages (i.e., "Yes" from 408); or if the Wi-Fi data does indicate a threshold change in the data that would necessitate establishing (or re-establishing) wireless service (i.e., "Yes" from 410); then at 414, the discovery message 122 is routed through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

At 416, a determination is made as to whether a response to the discovery message (e.g., SSDP/NDP type) has been received. If the response to the discovery message has not been received (i.e., "No" from 416), then the method continues at 406 to process and route the discovery message 122 in the IP layer 114 of the general layer architecture 110 in the device 100. If the response to the discovery message has been received (i.e., "Yes" from 416), then the method continues at 402 to monitor for subsequent discovery messages initiated from the device application(s).

Figure 5:
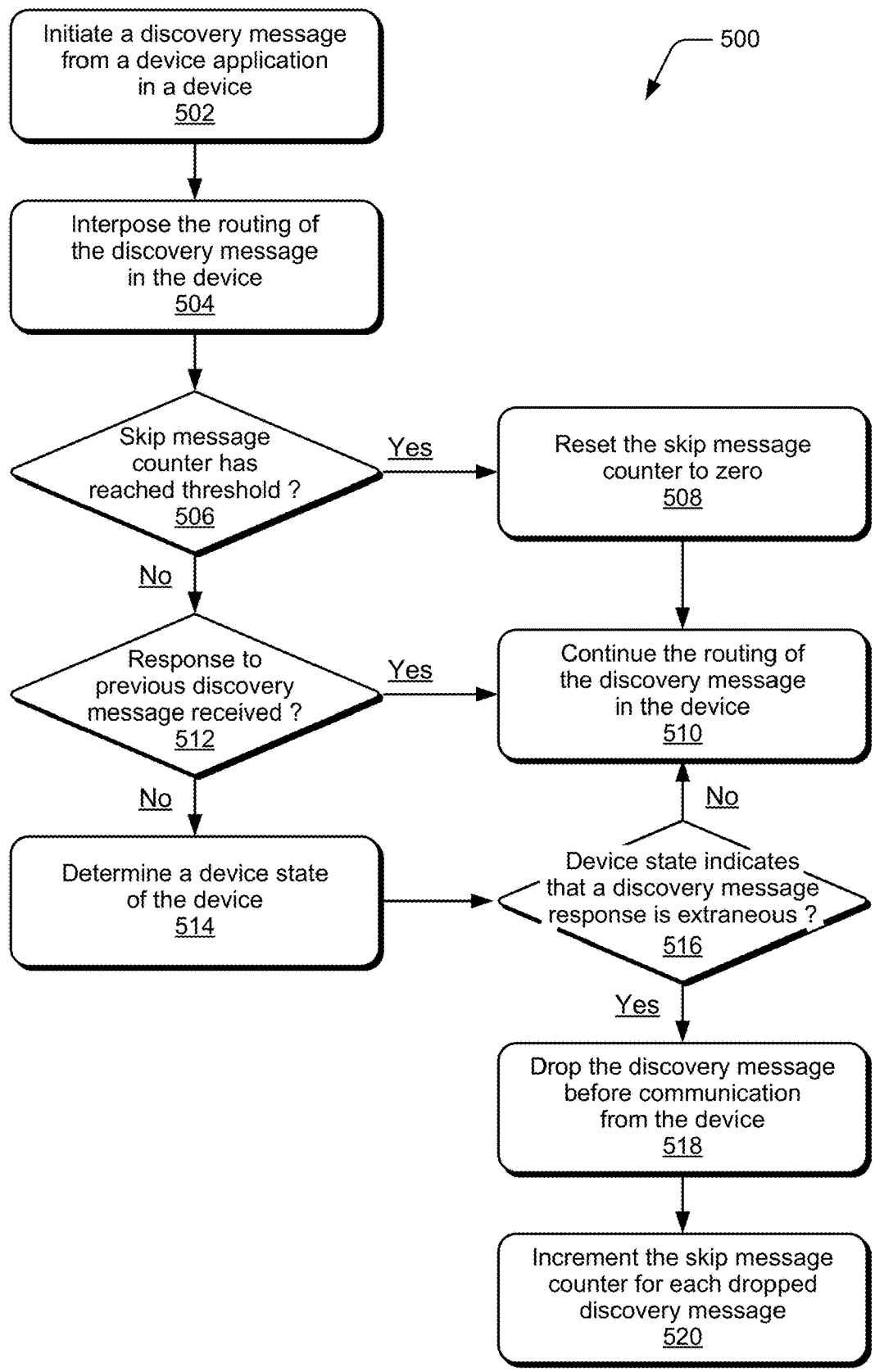
FIG. 5 illustrates an example method of dropping extraneous discovery messages in accordance with one or more implementations of the techniques described herein.

FIG. 5 illustrates example method(s) 500 of dropping extraneous discovery messages, and is generally described with reference to the status module implemented in a device. The order in which the method is described is not intended to be construed as a limitation, and any number or combination of the described method operations can be performed in any order to perform a method, or an alternate method.

At 502, a discovery message is initiated from a device application in a device. For example, an application 120 in the device 100 initiates a discovery message 122, generally as a multicast message initiated by the device application for network discovery or discovery of network services. The discovery message 122 may be a Simple Service Discovery Protocol (SSDP) message initiated by the device application 120 for discovery of network services; a Neighbor Discovery Protocol (NDP) message initiated by the device application 120 for network discovery; or a multicast Domain Name System (MDNS) message initiated by the device application 120 for IP address identification. Additionally, a discovery message 122 may be IP-based, or non-IP (MAC) based, such as for Wi-Fi SD or BLE advertisement.

At 504, the routing of the discovery message is interposed in the device with a discovery message monitor of a status module. For example, the discovery message monitor 128 of the status module 124 in the device 100 interposes the routing of the discovery message 122, such as in the IP layer 114 of the general layer architecture 110 in the device 100. The discovery message monitor 128 interposes the discovery message 122, which generally refers to functions or operations performed to detect and identify the discovery message 122, and subsequently determine whether the discovery message can be dropped prior to communication or transmission from the device.

At 506, a determination is made as to whether a skip message counter has reached a threshold. For example, the status module 124 in the device 100 includes the skip message counter 134 that is implemented to increment each time a discovery message is dropped, rather than the discovery message being communicated from the device. If the skip message counter 134 has reached a threshold (i.e., "Yes" from 506), then at 508, the skip message counter is reset to zero, and at 510, the routing of the discovery message is continued in the device. For example, the status module 124 in the device resets the skip message counter 134 to zero and routes the discovery message through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

If the skip message counter has not reached the threshold (i.e., "No" from 506), then at 512, a determination is made as to whether a response to the previous discovery message was received. For example, the status module 124 in the device 100 determines whether a response to the previous discovery message was received. If a response to the previous discovery message was received (i.e., "Yes" from 512), then at 510, the routing of the discovery message is continued in the device. For example, the status module 124 in the device routes the discovery message through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

If the response to the previous discovery message was not received (i.e., "No" from 512), then at 514, a device state of the device is determined with a device state monitor of the status module. For example, the device state monitor 130 of the status module 124 in the device 100 determines the device state 138 of the device. In implementations, the device state 138 of the device 100 can be determined from the device sensors 136 that indicate the device is in a stationary mode or in a vehicle mode. Alternatively or in addition, the device state 138 of the device 100 can be determined based on a cellular data threshold change that indicates the device is stationary or rapidly moving, or based on a Wi-Fi data threshold change that indicates the device is stationary or rapidly moving, such as in a vehicle.

At 516, a determination is made as to whether the device state indicates that a discovery message response is extraneous. For example, the status module 124 in the device 100 determines whether the device state 138 indicates that a discovery message response is extraneous (e.g., unneeded, irrelevant, or unnecessary). Notably, the discovery message response may be extraneous if the device state 138 of the device 100 is in either the stationary mode or in the vehicle mode, due to the device generally not moving, or moving too fast to meaningfully connect for service. Additionally, the device state 138 of the device 100 can be based on a predictive monitor 132 of the status module 124 that indicates the discovery message response is extraneous due to a location of the device.

If the device state indicates that a discovery message response is necessary (i.e., "No" from 516), then at 510, the routing of the discovery message is continued in the device. For example, the status module 124 in the device 100 routes the discovery message through the IP layer 114 to a corresponding component device for network communication or wireless transmission from the device 100 via the layers of the general layer architecture 110 to the corresponding network interface or wireless radio (e.g., the physical components in a physical layer of the general layer architecture 110).

If the device state indicates that a discovery message response is extraneous (i.e., "Yes" from 516), then at 518, the discovery message is dropped before communication from the device. For example, the status module 124 in the device 100 drops the discovery message 122 if the response to the previous discovery message was not received and based on the device state 138 indicating that a discovery message response is extraneous. Notably, dropping the discovery message 122 can maintain the device operating in a low-power or idle state and conserves battery power, as well as avoids contributing to communication bandwidth congestion. At 520, the skip message counter is incremented for each dropped discovery message. For example, the status module 124 in the device 100 increments the skip message counter 134 for each dropped discovery message.

Figure 6:
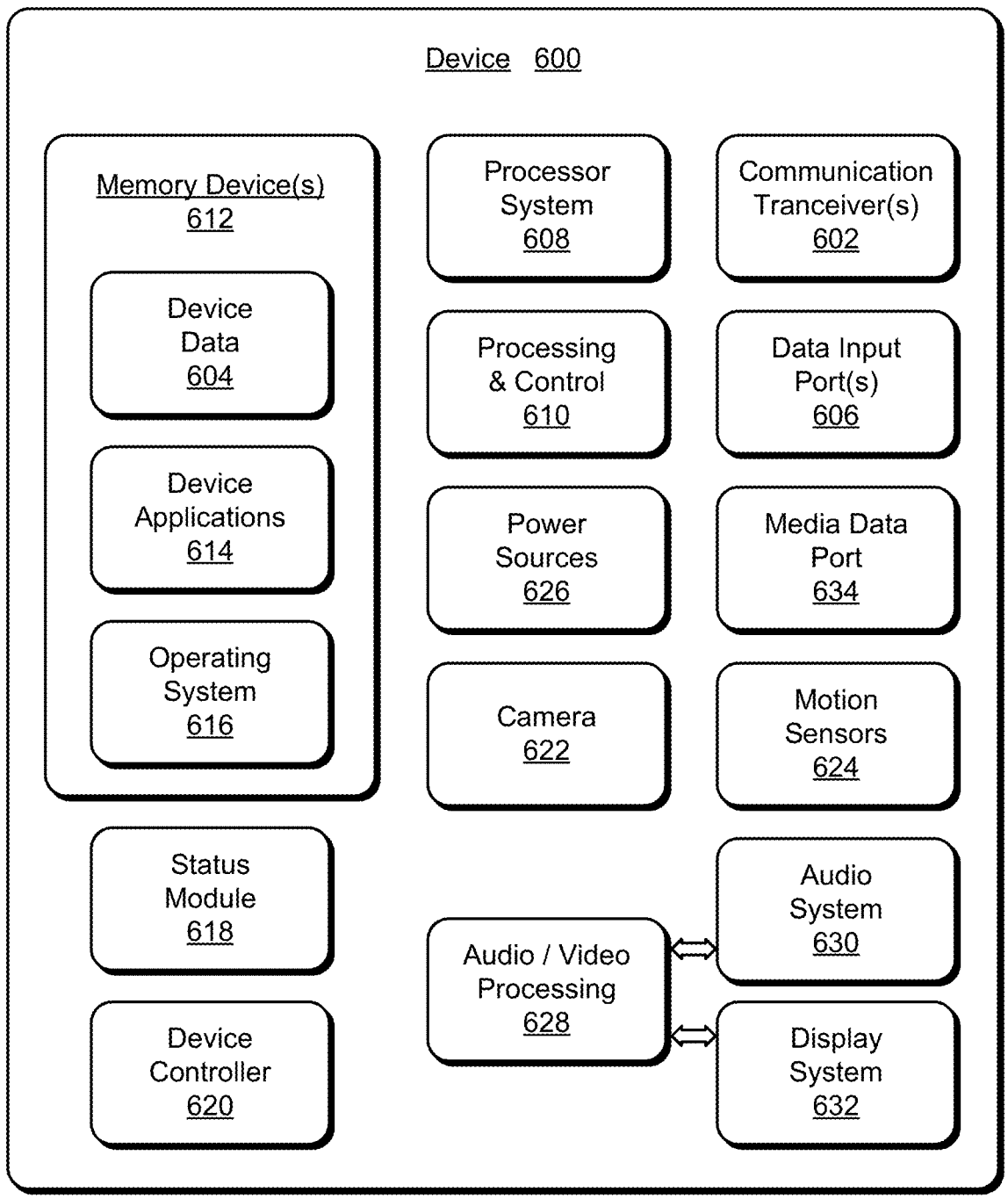
FIG. 6 illustrates various components of an example device that can implement aspects of dropping extraneous discovery messages.

FIG. 6 illustrates various components of an example device 600, in which aspects of dropping extraneous discovery messages can be implemented. The example device 600 can be implemented as any of the devices described with reference to the previous FIGS. 1-5, such as any type of a device, mobile device, access point, node device, IoT device, mobile phone, client device, wearable device, tablet, computing, communication, entertainment, gaming, media playback, and/or other type of electronic device. For example, the device 100 shown and described with reference to FIG. 1 may be implemented as the example device 600. Further a wearable device may include any one or combination of a watch, armband, wristband, bracelet, glove or pair of gloves, glasses, jewelry items, clothing items, any type of footwear or headwear, and/or other types of wearables.

The device 600 includes communication transceivers 602 that enable wired and/or wireless communication of device data 604 with other devices. The device data 604 can include any of the status module generated and/or determined data. Additionally, the device data 604 can include any type of audio, video, and/or image data. Example communication transceivers 602 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processor system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory 612 provides data storage mechanisms to store the device data 604, other types of information and/or data, and various device applications 614 (e.g., software applications). For example, an operating system 616 can be maintained as software instructions with a memory device and executed by the processor system 608. The device applications may also include a device manager, such as any form of a control application, software application, signal-processing and control module, code that is native to a particular device, a hardware abstraction layer for a particular device, and so on.

In this example, the device 600 includes a status module 618 that implements aspects of dropping extraneous discovery messages, as well as a device controller 620. The status module 618 may be implemented with hardware components and/or in software as one of the device applications 614, such as when the device 600 is implemented as the device 100 described with reference to FIG. 1. An example of the status module 618 is the status module 124 that is implemented as a software application and/or as hardware components in the device 100. In implementations, the status module 618 may include independent processing, memory, and logic components as a computing and/or electronic device integrated with the device 600.

In this example, the device 600 also includes a camera 622 and motion sensors 624, such as may be implemented as components of an inertial measurement unit (IMU). The motion sensors 624 can be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z coordinates) indicating position, location, and/or orientation of the device. The device 600 can also include one or more power sources 626, such as when the device is implemented as a mobile device. The power sources may include a charging and/or power system, and can be implemented as a flexible strip battery, a rechargeable battery, a charged super-capacitor, and/or any other type of active or passive power source.

The device 600 can also include an audio and/or video processing system 628 that generates audio data for an audio system 630 and/or generates display data for a display system 632. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 634. In implementations, the audio system and/or the display system are integrated components of the example device. Alternatively, the audio system and/or the display system are external, peripheral components to the example device.

Although implementations of dropping extraneous discovery messages have been described in language specific to features and/or methods, the subject of the appended claims is not necessarily limited to the specific features or methods described. Rather, the specific features and methods are disclosed as example implementations of dropping extraneous discovery messages, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: initiating a discovery message from a device application in a device; interposing a routing of the discovery message in the device with a discovery message monitor of a status module; determining whether a response to a previous discovery message was received; determining a device state of the device with a device state monitor of the status module; and dropping the discovery message before communication from the device if the response to the previous discovery message was not received and based on the device state of the device indicating that a discovery message response is extraneous.

Alternatively or in addition to the above described method, any one or combination of: incrementing a skip message counter for each dropped discovery message. Overriding the dropping of the discovery message based on a skip message counter that increments for each dropped discovery message reaching a threshold; continuing the routing of the discovery message in the device; and resetting the skip message counter to zero. The discovery message is a multicast message initiated by the device application for one of network discovery or discovery of network services. The discovery message is one of: a Simple Service Discovery Protocol (SSDP) message initiated by the device application for discovery of network services; a Neighbor Discovery Protocol (NDP) message initiated by the device application for network discovery; a multicast Domain Name System (MDNS) message initiated by the device application for IP address identification; a Wi-Fi Service Discovery message initiated by the device application; or a Bluetooth™ Low Energy (BLE) advertisement message initiated by the device application. The device state is determined from one or more device sensors that indicate the device being in one of a stationary mode or in a vehicle mode, and wherein the discovery message response is extraneous in either of the stationary mode or the vehicle mode of the device. The device state is determined based on one of a cellular data threshold change that indicates the device is stationary or rapidly moving, or a Wi-Fi data threshold change that indicates the device is stationary or rapidly moving. The determining of the device state of the device is further based on a predictive monitor of the status module that indicates the discovery message response is extraneous due to a location of the device. The dropping of the discovery message prevents physical transmission of packets and conserves battery power of the device. The dropping of the discovery message avoids contributing to communication bandwidth congestion.

A device, comprising: a device application to initiate a discovery message for communication from the device; a status module implemented at least partially in hardware to: interpose a routing of the discovery message in the device with a discovery message monitor of the status module; determine whether a response to a previous discovery message was received; and drop the discovery message if the response to the previous discovery message was not received and based on a device state indicating that a discovery message response is extraneous.

Alternatively or in addition to the above described device, any one or combination of: the status module is implemented to increment a skip message counter for each dropped discovery message. The status module is implemented to: override the discovery message being dropped based on skip message counter that increments for each dropped discovery message reaching a threshold; continue the routing of the discovery message in the device; and reset the skip message counter to zero. The discovery message is a multicast message initiated by the device application for one of network discovery or discovery of network services. A device state monitor of the status module is implemented to determine the device state based on input from one or more device sensors that indicate the device being in one of a stationary mode or in a vehicle mode, and wherein the discovery message response is extraneous in either of the stationary mode or the vehicle mode of the device. A device state monitor of the status module is implemented to determine the device state based on one of a cellular data threshold change that indicates the device is stationary or rapidly moving, or a Wi-Fi data threshold change that indicates the device is stationary or rapidly moving. The status module is implemented to drop the discovery message effective to conserve battery power of the device and avoid contributing to communication bandwidth congestion.

A method, comprising: receiving a discovery message from a device application in a device; determining whether a response to a previous discovery message was received; determining whether a discovery message response is necessary based on a device state of the device; and one of: dropping the discovery message if the response to the previous discovery message was not received and the determining that the discovery message response is extraneous; or continuing routing of the discovery message in the device if a skip message counter that increments for each dropped discovery message reaches a threshold.

Alternatively or in addition to the above described method, any one or combination of: the discovery message is a multicast message initiated by the device application for one of network discovery or discovery of network services; and the device state indicates the device being in one of a stationary mode or in a vehicle mode, rendering the discovery message response extraneous. The device state is determined based on one of a cellular data threshold change that indicates the device is stationary or rapidly moving, or a Wi-Fi data threshold change that indicates the device is stationary or rapidly moving.

The invention claimed is:

1. A method, comprising:
    initiating a discovery message from a device application in a device;
    interposing a routing of the discovery message in the device with a discovery message monitor of a status module, the discovery message interposed prior to transmission from the device;
    determining whether a response to a previous discovery message was received;
    determining a current device state of the device with a device state monitor of the status module, the current device state precluding receiving the response to the previous discovery message due to the device remaining stationary or the device moving faster than a connection threshold for service; and
    dropping the discovery message before communication from the device if the response to the previous discovery message was not received and based on the current device state of the device indicating that a discovery message response is extraneous.

2. The method as recited in claim 1, further comprising:
    incrementing a skip message counter for each dropped discovery message.

3. The method as recited in claim 1, further comprising:
    overriding the dropping of the discovery message based on a skip message counter that increments for each dropped discovery message reaching a threshold;
    continuing the routing of the discovery message in the device; and
    resetting the skip message counter to zero.

4. The method as recited in claim 1, wherein the discovery message is a multicast message initiated by the device application for one of network discovery or discovery of network services.

5. The method as recited in claim 1, wherein the discovery message is one of:
- a Simple Service Discovery Protocol (SSDP) message initiated by the device application for discovery of network services;
- a Neighbor Discovery Protocol (NDP) message initiated by the device application for network discovery;
- a multicast Domain Name System (MDNS) message initiated by the device application for IP address identification;
- a Wi-Fi Service Discovery message initiated by the device application; or
- a Bluetooth™ Low Energy (BLE) advertisement message initiated by the device application.

6. The method as recited in claim 1, wherein the current device state is determined from one or more device sensors that indicate the device being in one of a stationary mode or in a vehicle mode, and wherein the discovery message response is extraneous in either of the stationary mode or the vehicle mode of the device.

7. The method as recited in claim 1, wherein the current device state is determined based on one of a cellular data threshold change that indicates the device is stationary or rapidly moving, or a Wi-Fi data threshold change that indicates the device is stationary or rapidly moving.

8. The method as recited in claim 1, wherein the determining of the current device state of the device is further based on a predictive monitor of the status module that indicates the discovery message response is extraneous due to the device being stationary.

9. The method as recited in claim 1, wherein the dropping of the discovery message prevents physical transmission of packets and conserves battery power of the device.

10. The method as recited in claim 1, wherein the dropping of the discovery message avoids contributing to communication bandwidth congestion.

11. A device, comprising:
- a device application to initiate a discovery message for communication from the device;
- a status module implemented at least partially in hardware to:
- interpose a routing of the discovery message in the device with a discovery message monitor of the status module, the discovery message interposed prior to transmission from the device;
- determine whether a response to a previous discovery message was received; and
- drop the discovery message if the response to the previous discovery message was not received and based on a current device state indicating that a discovery message response is extraneous, the current device state precluding receiving the response to the previous discovery message due to the device remaining stationary or the device moving faster than a connection threshold for service.

12. The device as recited in claim 11, wherein the status module is implemented to increment a skip message counter for each dropped discovery message.

13. The device as recited in claim 11, wherein the status module is implemented to:
- override the discovery message being dropped based on skip message counter that increments for each dropped discovery message reaching a threshold;
- continue the routing of the discovery message in the device; and
- reset the skip message counter to zero.

14. The device as recited in claim 11, wherein the discovery message is a multicast message initiated by the device application for one of network discovery or discovery of network services.

15. The device as recited in claim 11, wherein a device state monitor of the status module is implemented to determine the current device state based on input from one or more device sensors that indicate the device being in one of a stationary mode or in a vehicle mode, and wherein the discovery message response is extraneous in either of the stationary mode or the vehicle mode of the device.

16. The device as recited in claim 11, wherein a device state monitor of the status module is implemented to determine the current device state based on one of a cellular data threshold change that indicates the device is stationary or rapidly moving, or a Wi Fi data threshold change that indicates the device is stationary or rapidly moving.

17. The device as recited in claim 11, wherein the status module is implemented to drop the discovery message effective to conserve battery power of the device and avoid contributing to communication bandwidth congestion.

18. A method, comprising:
- receiving a discovery message from a device application in a device, the discovery message interposed in the device prior to transmission from the device;
- determining whether a response to a previous discovery message was received;
- determining whether a discovery message response is necessary based on a device state of the device; and one of:
- dropping the discovery message if the response to the previous discovery message was not received and the determining that the discovery message response is extraneous based on the device state of the device moving faster than a connection threshold for service; or
- continuing routing of the discovery message in the device if a skip message counter that increments for each dropped discovery message reaches a threshold.

19. The method as recited in claim 18, wherein:
- the discovery message is a multicast message initiated by the device application for one of network discovery or discovery of network services; and
- the device state indicates the device being in one of a stationary mode or in a vehicle mode, rendering the discovery message response extraneous.

20. The method as recited in claim 18, wherein the device state is determined based on one of a cellular data threshold change that indicates the device is stationary or rapidly moving, or a Wi-Fi data threshold change that indicates the device is stationary or rapidly moving.

* * * * *